United States Patent [19]

Wawrla

[11] Patent Number: 6,026,803
[45] Date of Patent: Feb. 22, 2000

[54] COUPLING WITH BUILT-IN GASKET AND MECHANICAL LOCKING DEVICE

[75] Inventor: Martin Wawrla, Albany, N.Y.

[73] Assignee: Protech Manufacturing, Inc., Albany, N.Y.

[21] Appl. No.: 08/859,922

[22] Filed: May 21, 1997

[51] Int. Cl.[7] .................................................. F23J 11/00
[52] U.S. Cl. ...................... 126/307 R; 285/93; 285/110; 285/420; 285/424
[58] Field of Search .............................. 285/23, 424, 110, 285/420, 918, 93, 305; 126/307 R

[56] References Cited

U.S. PATENT DOCUMENTS

| | | |
|---|---|---|
| 627,673 | 6/1899 | McDonald . |
| 2,145,645 | 1/1939 | Byers . |
| 2,148,038 | 2/1939 | Raybould . |
| 2,158,829 | 5/1939 | Miller . |
| 3,148,902 | 9/1964 | Gardner et al. . |
| 4,194,769 | 3/1980 | Bram . |
| 4,296,953 | 10/1981 | Nagao et al. . |
| 4,303,262 | 12/1981 | Pierrel et al. . |
| 4,428,604 | 1/1984 | Conner . |
| 4,635,966 | 1/1987 | Hermann ............................... 285/23 X |
| 4,874,191 | 10/1989 | Green . |
| 5,037,144 | 8/1991 | Peting et al. . |
| 5,211,427 | 5/1993 | Washizu ..................................... 285/23 |
| 5,234,233 | 8/1993 | Fix ............................................ 285/23 |
| 5,431,454 | 7/1995 | Calmettes et al. ..................... 285/23 X |
| 5,671,955 | 9/1997 | Shumway ................................. 285/305 |

FOREIGN PATENT DOCUMENTS

| | | | |
|---|---|---|---|
| 651220 | 1/1963 | Italy ........................................ 285/305 |
| 1066936 | 4/1967 | United Kingdom ................... 285/305 |
| 923129 | 4/1993 | United Kingdom ................... 285/918 |

OTHER PUBLICATIONS

Z–Flex; *Model SVE Installation Instructions*; Tested and Listed by Underwriters Laboratories Inc., UL1738 & BH636.

When it Comes to Consistent Quality, We've Got a Lock on the Market; heat–fab Incorporated.

Star–34; The Gas Vent System for Category III & IV Gas Burning Appliances; Flex–L International Inc.; File CAT–348.

*Primary Examiner*—Dave W. Arola
*Attorney, Agent, or Firm*—Schmeiser, Olsen & Watts

[57] ABSTRACT

The present invention discloses a coupling for use in vent systems which is self-sealing. The coupling includes a gasket in a female part of the coupling that seals against an end of a male part. The female part also including a mechanical locking device that clamps onto a recess in the male part to prevent disconnection. The coupling prevents puddling of corrosive fluids in the coupling at points of metal-to-metal contact and, hence, prevents premature corrosion.

30 Claims, 3 Drawing Sheets

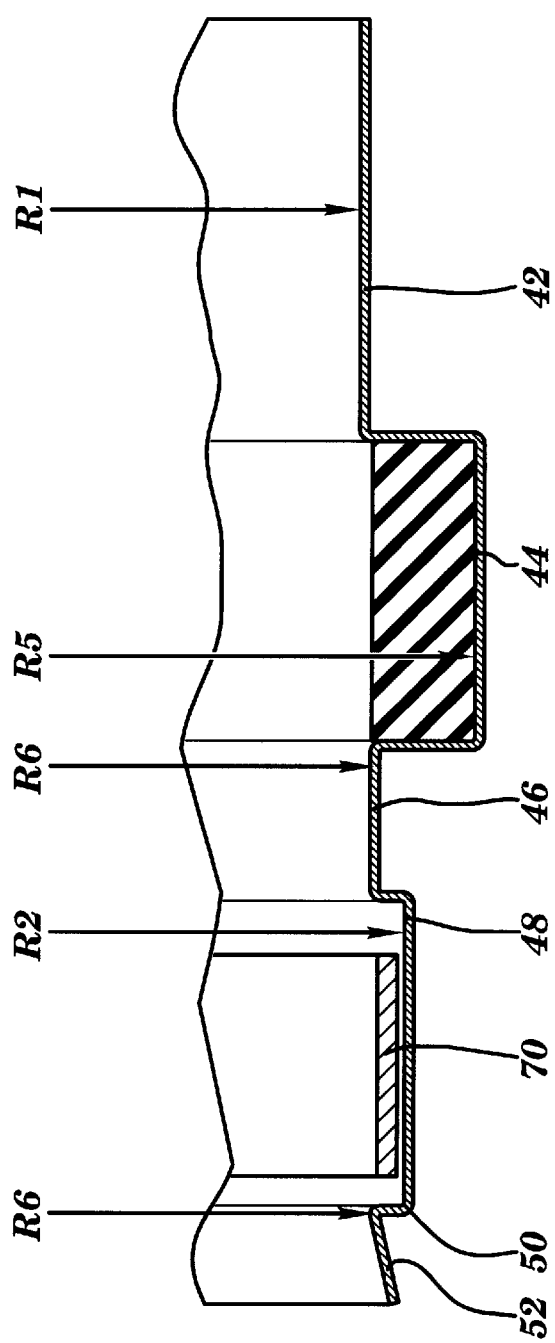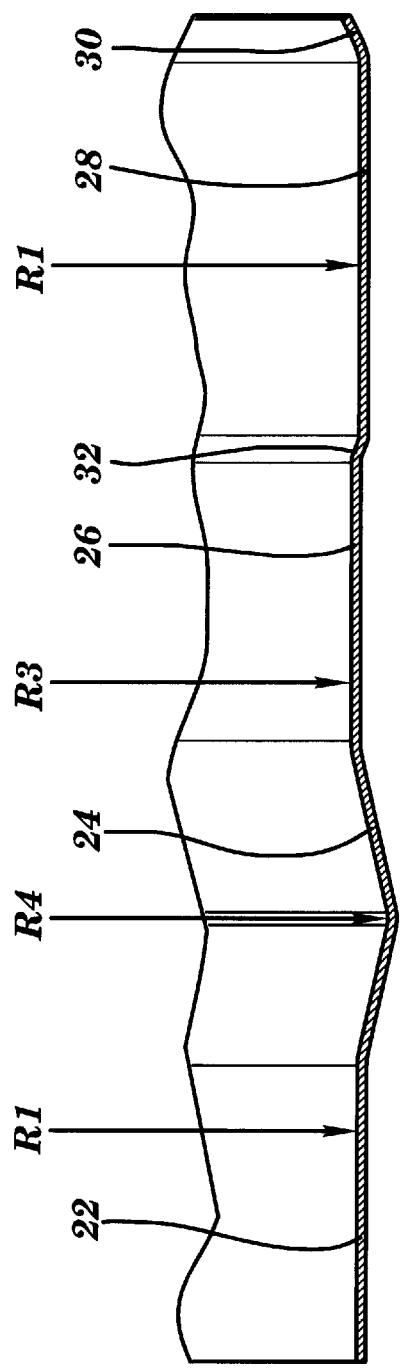
FIG. 2
FIG. 3

COUPLING WITH BUILT-IN GASKET AND MECHANICAL LOCKING DEVICE

BACKGROUND OF THE INVENTION

1. Technical Field

The present invention relates generally to couplings. More particularly, it relates to self-sealing vent pipe couplings having a gasket and mechanical locking device for advantageous use on pipes, tubes or vents formed of sheet material.

2. Related Art

Previously, new laws have required the use of new fuel burning appliances that capture more heat from each unit of fuel consumed. For example, home heating appliances come under the higher efficiency requirements. As higher efficiency heaters have evolved, they have expelled cooler exhaust gases resulting in reduced or insufficient flue draft. Ultimately, boilers and furnaces were created (Category II, III and IV) that could no longer be vented by negative pressure systems that rely on natural draft, but rather required the exhaust gases to be pressurized for the purpose of removing them from the premises.

As a by-product of low flue gas temperatures, condensation could now occur within exhaust systems and mix with chemical compounds to form acidic environments. To rectify this problem, plastic vents and other systems were developed and consequently used. Unfortunately, plastic vents due to high failure rates, are now either suspect or illegal.

Other contemporary venting systems have been found to be cumbersome to install, require many field modifications and employ manufacturing methods and product designs that render the long term performance of these vents questionable. For example, modifications may consist of cleaning ends of components with solvents or alcohol before applying sealants from tubes or other means to the component for the purpose of rendering the joint leakproof. Contemporary systems may also require joints to be held steady for 24 hours or until the applied sealants have cured, thus necessitating a waiting period before the heating unit can be operated. In systems currently available, this waiting period is often ignored, since the installer would have to return to the job site on the following day to check the system for tightness and to start-up the heating unit. As a result, for logistical and monetary reasons, manufacturers instructions are often ignored and the system's integrity compromised from the start.

U.S. Pat. No. 4,874,191 issued to Green and assigned to Heat-Fab, Inc. discloses a flue gas connector for joining together the ends of flue gas conduits by means of locking tabs on the outer surface of one flue gas conduit which may be bent over a locking ring or the other flue gas conduit. One disadvantage of this system is that the gasket is not integral with the coupling. Another disadvantage is that the process requires additional steps, such as cleaning of the inside of the female end and outside of the male end before applying silicone from a tube, during the installation process to provide a gasket thereon. A further disadvantage is that as the conduit is placed in a flue (e.g., a brick flue), the tabs 20 may inadvertently be pulled backward when contacting the interior of the flue, thus disconnecting the coupling.

Accordingly, it is a feature of this invention to provide pipe, vent or tube coupling without the disadvantages of the related art. Furthermore to provide a coupling to provide a leak-proof (gases and liquids) conduit from the heating equipment to the outside of residential/industrial/commercial spaces that is easy to install, minimizes the effects of corrosive condensates within the vent tube, or pipe, and eliminates installer errors or omissions.

SUMMARY OF THE INVENTION

This invention, when used in a venting system, safely contains flue gases and condensates from such flue gases that are expelled by a fuel burning apparatus or other equipment under positive or negative pressure and transports such gases without leakage to the outside of a heated space. The system components provide gas and liquid tight joints inherently and instantly, i.e. at the time of installation and thereafter. Once installed, they cannot come apart due to vibration, gravity, or other causes. Yet, they allow for future disconnection and gasket inspection when intended.

In order to achieve the above results, the invention provides a venting system where each system component, whether a length of tube, elbow, tee section, condensate drains, termination kits, or other component, features a built-in gasket as well as a built-in mechanical locking device. In particular the invention is a pipe coupling including a male pipe section, a female pipe section having an end, a first bead in the female pipe section and having a gasket mounted therein, a second bead section and having a mechanical locking device mounted therein, and a stop located in the male pipe section that engages the end of the female pipe section to position the pipe sections at a predetermined position whereat the gasket seals the male and female pipe sections and the mechanical locking device retains the sections in the sealing engagement with the gasket.

Furthermore, the invention is a pipe coupling including a female part with an interior surface having a first peripheral distance and a portion having a second peripheral distance, a male part receivable in the female part, the male part including an interior surface having the first peripheral distance and a portion having a third peripheral distance, the second peripheral distance being greater than the first peripheral distance and the first peripheral distance being greater than the third peripheral distance, and a mechanical locking device positioned in the portion having the second peripheral distance and adapted to be tightened to the portion having the third peripheral distance.

The invention is also a pipe coupling including a female part having an end, and a first interior surface diameter, an enlargement adjacent the end of the female part for holding a mechanical locking device, a gasket enlargement in the female part for holding a gasket, a male part receivable in the female part, the male part having an end and the first interior surface diameter, a recess in the male part extending inwardly of the first interior surface diameter thereof and located in the male part at a distance from the end of the male part, and wherein the recess is alignable with the enlargement such that the mechanical locking device can tighten to the recess to hold the female part and the male part together.

Manufacturing methods and designs are employed that render the preparation (cleaning) of components and the application of sealants in the field unnecessary eliminating installer error or omission. This results in fast, reliable and consistent vent installations as well as the elimination of lengthy "cure times" before heating units can be operated. Through the utilization of advanced welding and forming techniques and avoidance of crevices, the opportunity for accumulation of condensates and the possibility for crevice corrosion is minimized. The coupling is built into each component of a tubing, piping or venting system so as to render it gas and liquid tight. When connected to another component or vent length, the seal is provided by a gasket embedded in a groove or bead on the inside of one part of the coupling. The location of this gasket is designed to prevent gases or liquids from entering any space between metallic surfaces or to allow the formation of condensate accumulation. Installation of this gasket takes place at the point of manufacture and becomes an integral part of any component or vent length.

The subject invention eliminates the necessity for any field modifications such as cleaning ends of components with solvents or alcohol before applying sealants from tubes or other means to the component for the purpose of rendering the joint leakproof. It also eliminates the necessity to hold joints steady for 24 hours (or until the applied sealants have cured) and avoids any waiting period before the heating unit can be operated.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein:

FIG. 2 shows a cross sectional view of the female part of the pipe coupling in accordance with the present invention;

FIG. 3 shows a cross sectional view of the male part of the pipe coupling in accordance with the present invention.

DESCRIPTION OF THE PREFERRED EMBODIMENTS

Figure 1:
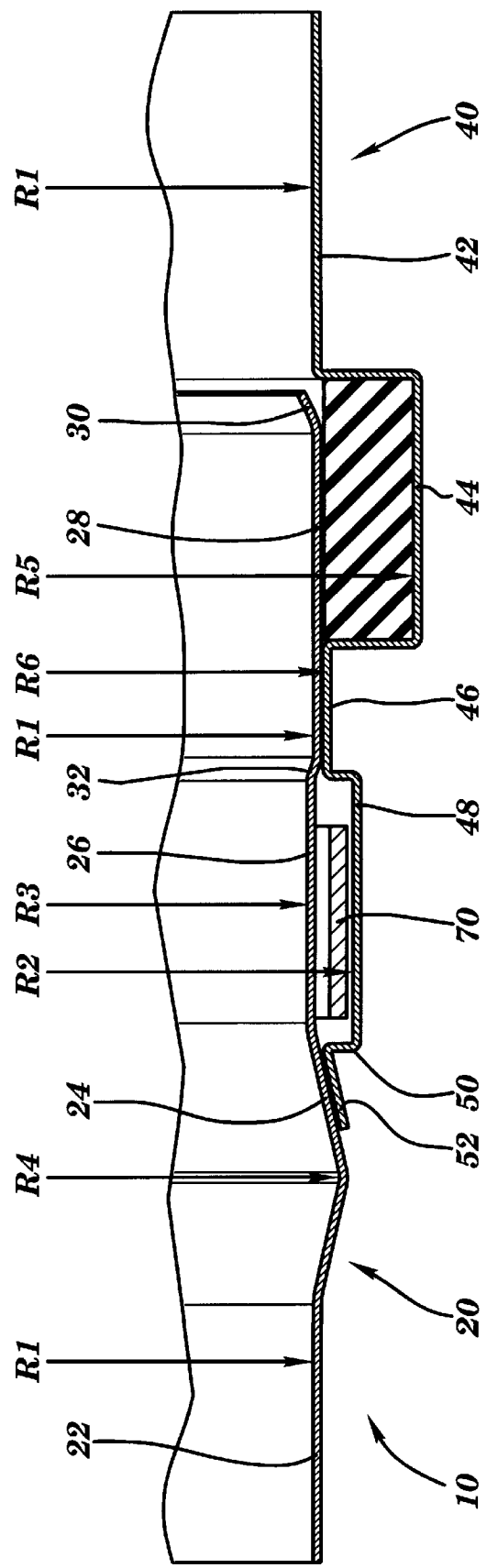
FIG. 1 shows a cross sectional view of the pipe coupling in accordance with the present invention.

Referring to FIGS. 1–3, the pipe coupling 10 in accordance with this invention is generally comprised of a male part 20 and a female part 40. The male and female parts are both fabricated from sheet material, and preferably from sheets of galvanized or stainless steel. However, the parts may be made from any metal or other sheet material or combinations thereof, such as extruded aluminum or cast materials, e.g., fiberglass, plastics. These parts can be provided on complementary ends of a variety of vent components, e.g., straight lengths, elbows, tee sections, condensate drains, termination kits, etc.

The parts are preferably fabricated in a cylindrical tube shape but a variety of shapes are possible. For instance, it is contemplated that the coupling in accordance with the present invention is used on polygonally shaped vents constructed of sheet material. Hereinafter, the term "pipe" shall be used, for brevity sake, to mean a pipe, tube or vent. With regard to other than cylindrical tube shaped vents, it is important to note that while the invention described hereafter is described only in terms of cylindrical tubes, the term "radius" is not used to denote a distance from the center of the tube because polygonal shaped vents are possible. In replacement, the term "peripheral distance" is used and is defined as a distance from the center of the vent whether it be a cylindrical or polygonal. Furthermore, a "bead shape" refers to a shape, such as 20, 44, 48, e.g., sheet material, that would result from a deformation of the material. Furthermore, the "bead shape" may be formed in a cast material and be similar to the deformation in a sheet material.

Regardless of shape, each of the parts are welded along their lengths in such a manner as to provide an essentially smooth (inside and out) longitudinal seam (not shown) that is gas and liquid tight. Furthermore, each of the parts has a general first peripheral distance R1 from the center of their respective centers to an internal surface.

In order to provide the coupling, the male and female part are provided with a variety of distinct bead or groove features. It is important to note that with respect to these features that while the preferred embodiment is presented with the beads/grooves shown in distinct parts, i.e., the male or female part, that reversal of the locale of the beads is also possible. Accordingly, the positioning disclosed is considered merely illustrative and variations are possible within the scope of the invention.

Figure 4:
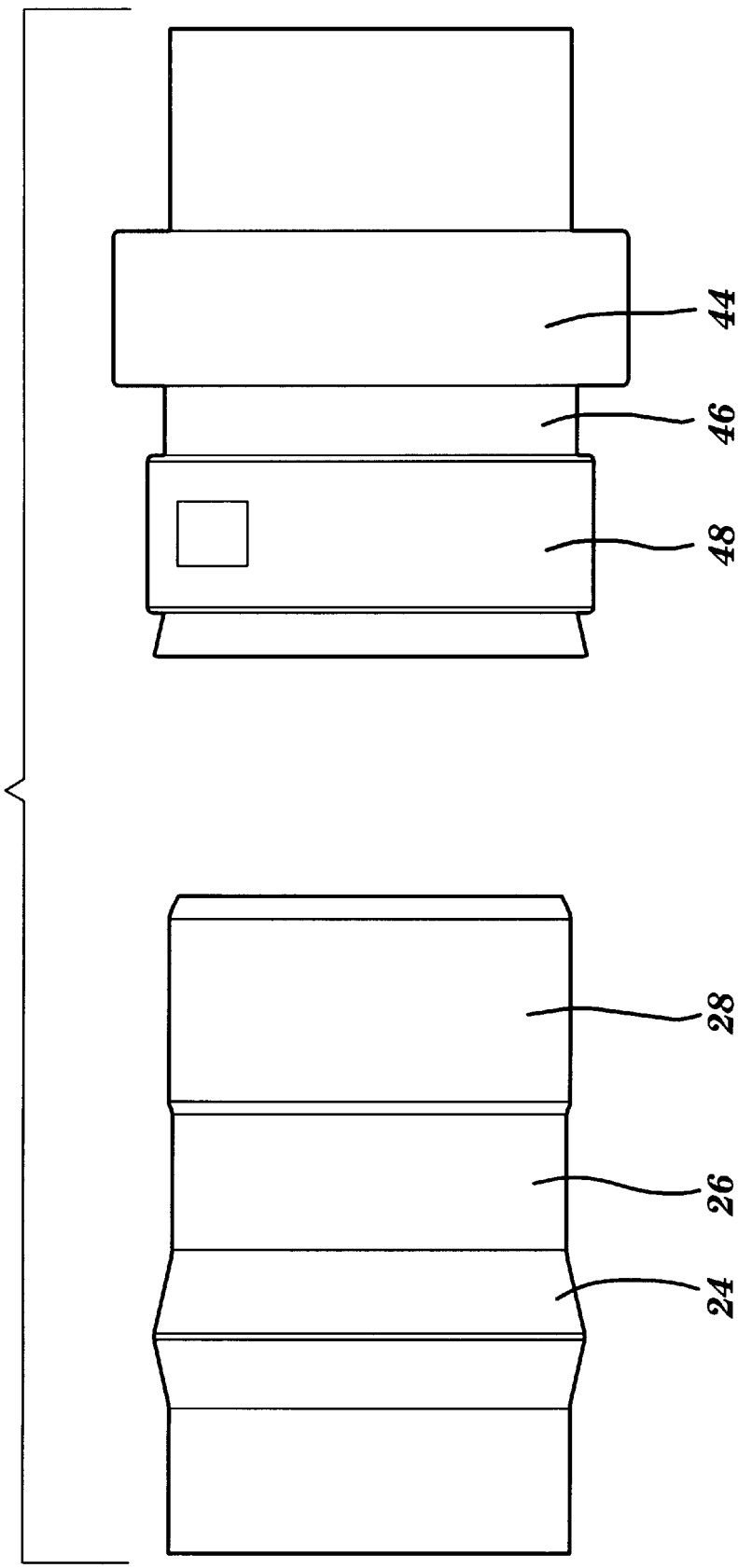
FIG. 4 shows a perspective view of the pipe coupling prior to joinder in accordance with the present invention.

Turning to FIGS. 1 and 2, the female part 40 having a general first peripheral distance R1 is provided with a bead, groove or enlargement 48 which extends outwardly from the interior of the female part to a second peripheral distance R2. The bead 48 extends sufficiently outward to enclose a connector or mechanical locking device, preferably in the form of a stainless steel hose clamp 70. In order to allow adjustment of the clamp 70, the bead 48 includes an opening 72, as shown in FIG. 4, which enables a turnbuckle 74 or like clamp adjuster to protrude out of the bead 48 for adjustment by a user. When the male part is manufactured, the clamp 70 is loosened or expanded sufficiently such that it is stored away in the bead 48 and does not interfere with the male part 20 when the male part is slid into the female part 40.

The male part 20 includes a portion 22 having a first peripheral distance R1 and, a bead, groove or recess 26 which, when the male part and female part are in a mating position, faces the bead 48 in the female part 40. As a result, when the clamp mechanical locking device 70 is tightened, it clamps onto the male part 20 in the bead 26. Accordingly, when the mechanical locking device 70 is tightened, the male and female part are locked from separation since the mechanical locking device clamp prohibits sliding of either part longitudinally because of its encapsulation in beads 26 and 48. The bead 26 has a third peripheral distance R3 from the center of the male part 20.

In order to assure proper alignment of the bead 26 and bead 48, the male part additionally includes a stop 24 adjacent to bead 26. The stop 24 preferably being in the form of a bead or groove having a fourth peripheral distance R4 from the center of the vent male part 20. The stop 24 can also be in the form of any structure that will abut the end 52 of the female part 40 when it is mated with the male part 20. For instance, the stop can be a weld or ring on the outer periphery of the male part. In the alternative shown, the stop 24 is an angled bead or groove and the end 52 of the female part 40 is outwardly slanted from the end of bead 48 such that it has a matching angle to that of stop 24. Accordingly, when the two parts 20 and 40 are mating, the end 52 of the female part rests against the stop 24 to prevent further longitudinal sliding in the mating direction.

In order to provide a sealed coupling, the female part 40 includes a bead, groove or enlargement 44 having a gasket 80 mounted therein. The bead 44 extends outwardly from the center of the female part to a fifth peripheral distance R5. The gasket 80 is preferably made of either mortar, plastic, elastic, rubber, silicone, and fibrous material. However, the gasket 80 may be formed of any material that provides a sealing function. The gasket 80 also may include one or more fingers 82 extending therefrom to seal against an end of the male part 20. Additionally, the gasket 80 is installed at time of manufacture to be an integral part of the female part.

The gasket 80, in order to seal the coupling, must have a surface to seal against. This is also provided by the positioning of the stop 24. In this case, the end 28 of the male part 20 is positioned such that it is aligned with the gasket 80. As a result, the gasket 80 seals against the outer periphery of the male part at its end 28. Fingers 82 on the gasket aid in the sealing. To provide guidance of the male part into the female part during joinder, the end 28 of the male part 20 also includes an inwardly slanted end 30.

Intermediate the bead 44 and bead 48 in the female part, the female part has a portion 46 which has a sixth peripheral distance R6 from the center of the vent coupling. The sixth peripheral distance R6 is set to a distance such that the interior surfaces of the male part 20 and female part 40, having the same general inner peripheral distance R1 and, are substantially collinear when mated. In other words, the sixth peripheral distance matches the outer peripheral distance of the male part so that they are in circumferential surface contact at the portion 46. However, since the gasket 80 is provided between this first point of metal-to-metal contact, corrosive fluids that would normally puddle in the joint between the parts are sealed out.

As illustrated in FIG. 1, the precision of the relative peripheral distances is very important. In summary, the distances are related as follows:

R3<R1<R6<R2. Furthermore, R3<R1<R6<R5< and R4<R6.

During connection of the coupling in accordance with the present invention, the male part 20 is aligned with the female part, as shown in FIG. 4, and guided into the female part 40 aided by the inwardly slanted end 30 of the male part. Once the end 52 of the female part 40 rests against the stop 24 of the male part 20, any further longitudinal movement in the mating direction is prevented. Sealing of the coupling is created immediately when the end 28 of the male part slides onto the gasket and is assured when the clamp 70 is tightened into the bead 26 to lock the parts together.

The resulting coupling when used on a new generation fuel burning apparatus or other equipment, safely contains flue gases and condensates from such flue gases that are expelled by the apparatus under positive or negative pressure and transports such gases without leakage to the outside of a heated space. The coupling provides gas and liquid tight joints instantly, i.e. at the time of installation and thereafter, and once installed assures the parts 20, 40 cannot come apart due to vibration, gravity, or other causes. Yet, the coupling allows for future disconnection when intended. Furthermore, the coupling prevents puddling of condensates between metal surfaces where the condensate acts to corrode the vent. The vent, therefore, lasts longer.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

I/we claim:

1. A pipe coupling comprising:
   a male pipe section;
   a female pipe section having an end;
   a first bead in the female pipe section and having a gasket mounted therein;
   a second bead in the female pipe section and having a mechanical locking device mounted therein; and
   a stop located in the male pipe section that engages the end of the female pipe section to position the pipe sections at a predetermined position whereat the gasket seals the male and female pipe sections and the mechanical locking device retains the sections in sealing engagement with the gasket.

2. The pipe coupling of claim 1, wherein the mechanical locking device is a clamp; and
   the male pipe section includes a third bead that receives the clamp and prevents longitudinal movement of the pipe sections when the clamp is tightened.

3. The pipe coupling of claim 2, wherein the first bead and second bead extend outwardly; and
   the third bead extends inwardly.

4. The pipe coupling of claim 1, wherein the first bead is adjacent to an end of the male pipe section.

5. The pipe coupling of claim 1, wherein the stop is a bead.

6. The pipe coupling of claim 1, wherein the male pipe section and female pipe section are in circumferential contact at a portion between the first and second bead.

7. The pipe coupling of claim 1, wherein the male pipe section includes an inwardly slanted end; and
   the end of the female pipe section is an outwardly slanted end that rests against the stop.

8. The pipe coupling of claim 1, wherein the gasket is made of one of mortar, plastic, elastic, rubber, silicone, and fibrous material.

9. The pipe coupling of claim 1, wherein the gasket includes at least one inwardly extending finger.

10. A vent system comprising components coupled with the coupling of claim 1.

11. A pipe coupling comprising:
    a female part with an interior surface having a first peripheral distance and a portion having a second peripheral distance;
    a male part receivable in the female part, the male part including an interior surface having the first peripheral distance and a portion having a third peripheral distance, the second peripheral distance being greater than the first peripheral distance and the first peripheral distance being greater than the third peripheral distance;
    a mechanical locking device positioned in the portion having the second peripheral distance and adapted to be tightened to the portion having the third peripheral distance; wherein the mechanical locking device is an adjustable clamp, the pipe coupling further including:
    an opening in the portion having the second peripheral distance; and
    a turnbuckle on the clamp to adjust the diameter of the clamp, the turnbuckle extending through the opening.

12. A pipe coupling comprising:
    a female part with an interior surface having a first peripheral distance and a portion having a second peripheral distance;

a male part receivable in the female part, the male part including an interior surface having the first peripheral distance and a portion having a third peripheral distance, the second peripheral distance being greater than the first peripheral distance and the first peripheral distance being greater than the third peripheral distance;

a mechanical locking device positioned in the portion having the second peripheral distance and adapted to be tightened to the portion having the third peripheral distance; and wherein the male part includes a portion having a fourth peripheral distance adjacent the portion having the third peripheral distance, the fourth peripheral distance being greater than the first peripheral distance, and wherein an end of the female part rests against the portion having the fourth peripheral distance to position the male and female part to align the second peripheral distance and the third peripheral distance for receipt of the mechanical locking device in the third peripheral distance.

13. The pipe coupling of claim 12, wherein the end of the female part is an outwardly slanted end.

14. The pipe coupling of claim 12, wherein the male part includes an inwardly slanted end.

15. A pipe coupling comprising:

a female part with an interior surface having a first peripheral distance and a portion having a second peripheral distance;

a male part receivable in the female part, the male part including an interior surface having the first peripheral distance and a portion having a third peripheral distance, the second peripheral distance being greater than the first peripheral distance and the first peripheral distance being greater than the third peripheral distance;

a mechanical locking device positioned in the portion having the second peripheral distance and adapted to be tightened to the portion having the third peripheral distance; and wherein the female part further includes a portion for holding a gasket having a fifth peripheral distance positioned oppositely a portion of the male part having the first peripheral distance, the fifth peripheral distance being greater than the first peripheral distance.

16. The pipe coupling of claim 15, including a gasket in said portion for holding a gasket wherein the gasket is made of one of mortar, plastic, elastic, rubber, silicone, and fibrous material.

17. The pipe coupling of claim 15, including a gasket in said portion for holding a gasket wherein the gasket includes at least one inwardly extending finger.

18. The pipe coupling of claim 15, wherein the fifth peripheral distance is greater than the second and third peripheral distances.

19. The pipe coupling of claim 15, wherein the female part further includes a portion having a sixth peripheral distance positioned between the portion having the second peripheral distance and the portion having the fifth peripheral distance, the sixth peripheral distance being greater than the first peripheral distance.

20. A pipe coupling comprising:

a female part having an end and a first interior surface diameter;

an enlargement adjacent the end of the female part holding a mechanical locking device;

a gasket enlargement in the female part for holding a gasket;

a male part receivable in the female part, the male part having an end and the first interior surface diameter;

a recess in the male part extending inwardly of the first interior surface diameter thereof and located in the male part at a distance from the end of the male part;

wherein the recess is alignable with the enlargement such that the mechanical locking device can tighten to the recess to hold the female part and the male part together; and wherein the male part includes an enlargement adjacent the recess, and wherein the end of the female part rests against the enlargement to position the female and male parts for sealing.

21. The pipe coupling of claim 20, wherein the end of the female part is an outwardly slanted end; and the end of the male part includes an inwardly slanted end.

22. The pipe coupling of claim 20, wherein the female part further includes a portion between the enlargement and gasket enlargement having a diameter greater than the first interior surface diameter.

23. The pipe coupling of claim 20, including a gasket in said portion for holding a gasket wherein the gasket is made of one of mortar, plastic, elastic, rubber, silicone, and fibrous material.

24. The pipe coupling of claim 20, including a gasket in said portion for holding a gasket wherein the gasket includes at least one inwardly extending finger.

25. A pipe coupling comprising:

a female part having an end and a first interior surface diameter;

an enlargement adjacent the end of the female part holding a mechanical locking device;

a casket enlargement in the female part for holding a gasket;

a male part receivable in the female part, the male part having an end and the first interior surface diameter;

a recess in the male part extending inwardly of the first interior surface diameter thereof and located in the male part at a distance from the end of the male part;

wherein the recess is alienable with the enlargement such that the mechanical locking device can tighten to the recess to hold the female part and the male part together; and wherein the mechanical locking device is a clamp, the pipe coupling further including:

an opening in the enlargement; and a turnbuckle on the clamp to adjust the diameter of the clamp, the turnbuckle extending through the opening.

26. The pipe coupling of claim 20, wherein the male part and female part are made of sheet material.

27. A fuel burning appliance comprising:

a heater; and a vent pipe, said vent pipe including:

a male pipe section formed from sheet material;

a female pipe section formed from sheet material;

a first bead located in the female pipe section and having a gasket mounted therein;

a second bead located in the female pipe section and having a connector mounted therein;

a stop located in one of the male and female pipe sections to position the pipe sections at a predetermined position; and a portion between the first and second beads at which the male and female pipe sections are in circumferential surface contact.

28. A pipe coupling comprising:

a female pipe section having a first and second outwardly extending bead and an end;

a male pipe section having a bead extending inwardly of an interior surface of the male pipe section, the male pipe section having an end;

a gasket mounted in the first bead;

a stop located in one of the male and female pipe sections that engages an end of one of the male and female pipe sections at a predetermined position whereat the gasket seals the male and female pipe sections;

a connector mounted in the second outwardly extending bead and adjustable to enter into the bead extending inwardly in the male pipe section when the female and male pipe sections are mated to retain the sections in sealing engagement; and wherein the stop is in the male pipe section and the stop rests against the end of the female pipe section.

29. The pipe coupling of claim 28, wherein the connector is a clamp.

30. The pipe coupling of claim 28, wherein the end of the male pipe section is inwardly slanted, and the end of the female pipe section is outwardly slanted.

* * * * *